(12) United States Patent
Sheehan

(10) Patent No.: US 7,543,467 B2
(45) Date of Patent: Jun. 9, 2009

(54) PORTABLE LOCK WIRELESSLY CONNECTABLE TO SECURITY SYSTEM

(76) Inventor: Thomas R. Sheehan, 85 Glendale Dr., Newnan, GA (US) 30265

( * ) Notice: Subject to any disclaimer, the term of this patent is extended or adjusted under 35 U.S.C. 154(b) by 490 days.

(21) Appl. No.: 11/523,350

(22) Filed: Sep. 19, 2006

(65) Prior Publication Data

US 2008/0066502 A1 Mar. 20, 2008

(51) Int. Cl.
*E05B 65/00* (2006.01)
*E05B 45/06* (2006.01)

(52) U.S. Cl. ................... 70/57.1; 70/49; 70/439; 70/441; 340/542

(58) Field of Classification Search .......... 70/49, 70/51, 57, 57.1, 58, 233, 432, 439, 441, DIG. 49; 340/542, 547, 551, 561, 568.1
See application file for complete search history.

(56) References Cited

U.S. PATENT DOCUMENTS

| | | | |
|---|---|---|---|
| 3,755,778 A * | 8/1973 | Kennedy et al. ............. 70/233 |
| 3,781,861 A * | 12/1973 | Adler et al. ................. 70/233 |
| 3,824,540 A * | 7/1974 | Smith, II .................... 70/233 |
| 3,993,987 A * | 11/1976 | Stevens ....................... 70/49 |
| 4,546,345 A * | 10/1985 | Naito ......................... 340/542 |
| 4,776,188 A * | 10/1988 | Dalaba et al. ................. 70/49 |
| 4,811,578 A | 3/1989 | Masoncup et al. |
| 5,097,253 A | 3/1992 | Eschbach et al. |
| 5,404,735 A | 4/1995 | Hsieh |
| 5,406,263 A | 4/1995 | Tuttle |
| 5,408,212 A * | 4/1995 | Meyers et al. ............... 70/233 |
| 5,525,966 A | 6/1996 | Parish |
| 5,587,702 A | 12/1996 | Chadfield |
| 5,727,405 A | 3/1998 | Cromwell |
| 5,841,356 A * | 11/1998 | Woodruff et al. ........... 340/542 |
| 6,356,192 B1 | 3/2002 | Menard et al. |
| 6,737,969 B2 | 5/2004 | Carlson et al. |
| 6,753,775 B2 | 6/2004 | Auerbach et al. |
| 6,755,055 B2 * | 6/2004 | Sedon et al. ................. 70/57.1 |
| 6,778,083 B2 | 8/2004 | Auerbach et al. |
| 6,778,086 B2 | 8/2004 | Morrone et al. |
| 6,798,342 B2 | 9/2004 | Addy |
| 6,832,072 B2 | 12/2004 | Buckingham et al. |
| 7,104,091 B2 * | 9/2006 | Kuhblank .................... 70/49 |
| 2004/0066302 A1 | 4/2004 | Menard et al. |
| 2004/0183670 A1 | 9/2004 | Ferrara |

FOREIGN PATENT DOCUMENTS

EP 1369825 12/2003

* cited by examiner

*Primary Examiner*—Patricia L Engle
*Assistant Examiner*—Christopher Boswell
(74) *Attorney, Agent, or Firm*—Miller & Martin PLLC

(57) ABSTRACT

This invention relates to a portable locking device having a wireless transmitter that transmits the condition of the locking device to the receiver of a security system. The locking device comprises non-rigid cable so that it can be easily connected to various objects. Cutting the cable triggers prevents power from reaching the wireless transmitter, and the lack of signal triggers the security system to issue an alarm. The portable locking device comprises parallel armed and disarmed circuits to supply electricity to the wireless transmitter, but the armed circuit is broken if the lock is tampered with or compromised when locked.

20 Claims, 2 Drawing Sheets

PORTABLE LOCK WIRELESSLY CONNECTABLE TO SECURITY SYSTEM

FIELD OF THE INVENTION

The present invention relates generally to a portable locking device having a wireless transmitter which electronically connects the locking device to a security system which monitors the condition of the locking device and transmits that condition either continuously or periodically to the receiver of a security system. The security system can report on the condition of the locking device and trigger an alarm if the lock is opened, broken or taken out of the range of the receiver.

DESCRIPTION OF RELATED ART

Wireless components for security systems currently exist. Such components include magnetic contacts for attachment to doors or windows, motion detectors, smoke and fire detectors, flood detectors and temperature detectors. These devices may be hard-wired or wirelessly connected to a security system which can report on the condition of the devices.

Portable padlocks with wireless transmitters also currently exist. For example, U.S. Pat. No. 4,811,578 discloses a padlock with a battery powered alarm built into it. The alarm signal may be audible signal or an inaudible signal transmitted as a radio wave to a remote receiver.

U.S. Pat. No. 5,587,702 also discloses a padlock which when opened will emit an audible signal as well as an inaudible signal in the form of a radio or microwave transmission which may be received at some remote location.

One problem with the prior art is that the alarm can be bypassed by simply cutting the shackle on the lock. Because the locks are spring loaded, the shackle can be held down, broken, and taped down without setting off the alarm. This makes the prior art portable locks susceptible to being easily by-passed.

Moreover, the prior art locks contain rigid shackles which cannot be adjusted for locking larger objects such as motorcycles, boats, trailers, recreational vehicles, etc. . . . or oddly shaped objects which cannot be locked using a lock with a rigid shackle.

SUMMARY OF THE INVENTION

It is an object of the present invention to provide a locking device which is portable and may be used in a remote location within wireless range of a security system, and includes a wireless transmitter connecting it to the security system to monitor the condition of the locking device.

Another object of the present invention is to provide a portable locking device which cannot be bypassed by simply cutting the shackle of the lock.

Another object of the present invention is to provide a portable locking device which has a non-rigid shackle so that it can be easily connected to a wider range of objects.

Another object of the present invention is to provide a portable locking device which has a non-rigid shackle that can be adjusted for locking larger items.

Another object of the present invention is to provide a portable locking device which cannot be bypassed by cutting the shackle of the lock and which can be manufactured and sold at a low cost.

It is another object of the present invention to provide a portable locking device which may be easily transported, carried and stored.

Accordingly, a presently preferred embodiment of the present invention provides a portable locking device comprising of a wireless transmitter which electronically connects the locking device to a security system which monitors the condition of the locking device. The locking device's wireless transmitter can transmit the condition of the locking device either continuously or periodically to the receiver of a security system. If the locking device is opened, broken or fails to report because it has been taken out of the range of the receiver, the security system reports on the condition of the locking device and/or triggers an alarm.

The portable locking device of the present invention may also operate with a global positioning system for tracking objects to which it is attached and reporting on the location of the objects.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
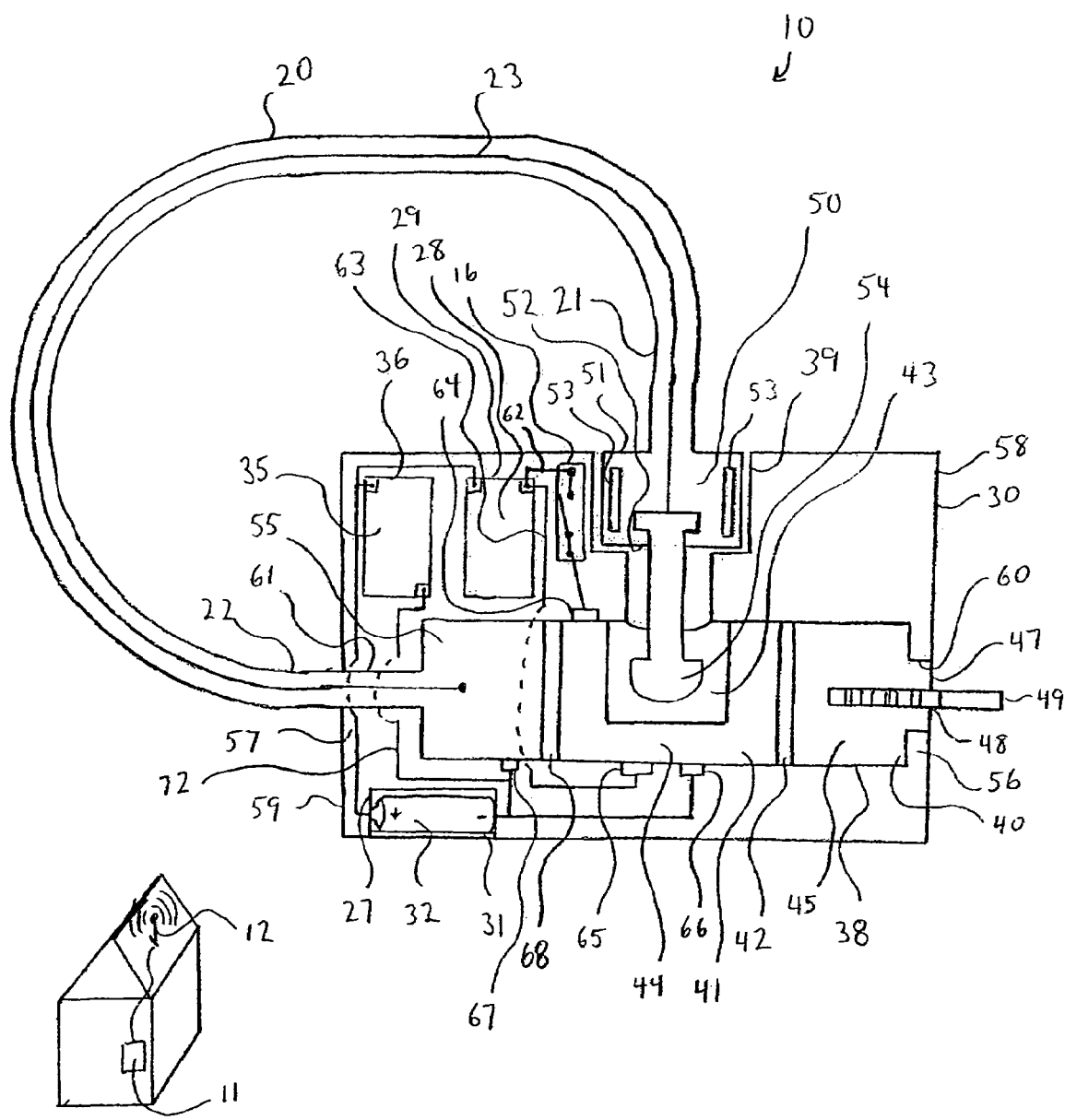
FIG. 1 is a mid-plane cross sectional view of an embodiment of the portable locking device of the present invention when the cylindrical latching mechanism is in the unlocked position.

This invention teaches a portable locking device 10 capable of being wirelessly connected to a security system 11 through a receiver 12 (shown in stylized form). FIG. 1 shows a cross section of a first embodiment of the portable locking device 10 when the cylindrical latching mechanism 40 is in the unlocked position.

The locking device 10 comprises a substantially solid casing or housing 30 and a flexible cable 20. The housing 30 may be fashioned from any sturdy, hardened material suitable for the security purposes of this invention, such as hardened plastic or metal, though if metal is used, care must be taken to provide appropriate insulation around the various wires and electrical contact points within the housing and between components of the locking device 10 to ensure proper functioning.

The housing 30 comprises an enclosed cylindrical latching mechanism cavity 38 and a latch cavity 39. The latch cavity 30 opens into or connects to the latching mechanism cavity 38, preferably perpendicularly, inside the housing 30. The latching mechanism cavity 38 transverses the housing 30 with openings 60, 61 in the housing 30 at both ends 58, 59. The housing 30 further comprises abutments 56, 57 at either end 58, 59 which narrow the cavity openings 60, 61, making the diameter of the openings 60, 61 smaller than the diameter of the cylindrical latching mechanism cavity 38. The housing 30 also comprises an internal transmitter cavity 29 and, as shown in the preferred embodiment illustrated in FIG. 1, may also comprise an alternate internal GPS (Global Positioning System) cavity 36.

The housing 30 may be shaped like a traditional padlock or bicycle lock or may take any other shape as desired.

Finally, the housing 30 further comprises an internal power source cavity 27. The electrical power source for the present invention may comprise one or more batteries 32 as illustrated in FIG. 1, or, in an alternate embodiment, the power source may comprise an electrical cord (not shown) that will need to be plugged into an external power source such as a wall socket (not shown). As is typical, the power source has first and second terminals for electrical connections through which an electric current may pass. The housing 30 further comprises a removable cavity cover 31 for the power source cavity 27 to allow the batteries 32 to be removed and replaced. The cavity cover 31 should only be removeable when the key 49 is used to turn the latching mechanism 40 to the unlocked position. In an alternate embodiment, the cavity cover 31 or an outside portion of the housing 30 may be fitted with a solar cell (not shown) to recharge the batteries 32. In another alternate embodiment not illustrated in the drawings, the power source cavity 27 may be located within the housing 30 adjacent and opening into the latch cavity 39 such that the batteries 32 can only be removed when the latch 50 is removed from the latch cavity 39. In this alternate configuration, the cavity cover 31 would comprise a removable portion of the wall of the latch cavity 39.

The latching mechanism cavity 38 is sized to receive a cylindrical latching mechanism 40 which is held within the latching mechanism cavity 38 by the abutments 56, 57. The latching mechanism 40 comprises a unitary cylinder 46 comprising an outer end 47 having a lock mechanism 45 adjoined to a first electrically non-conductive spacer 42 adjoined to an electrically conductive catch portion 41 adjoined to a second electrically non-conductive spacer 68 adjoined to an electrically conductive second end 55.

The lock mechanisms 45 useful in the present invention may take any structure known in the art which is useful to interact with a cooperating portion of the housing to lock the cylindrical latching mechanism in place relative to the housing. In one embodiment, a key slot 48 in the outer end 47 of the latching mechanism 40 receives a key 49 through cavity opening 60. The key 49 operates the lock mechanism 45 allowing the cylindrical latching mechanism 40 to be turned between an unlocked position (shown in FIG. 1) and a normal, locked position (shown in FIG. 2). The key 49 may only be removed when the latching mechanism 40 is in the locked position. The latching mechanism 40 may only be turned to the unlocked position when the key 49 is inserted.

Figure 2:
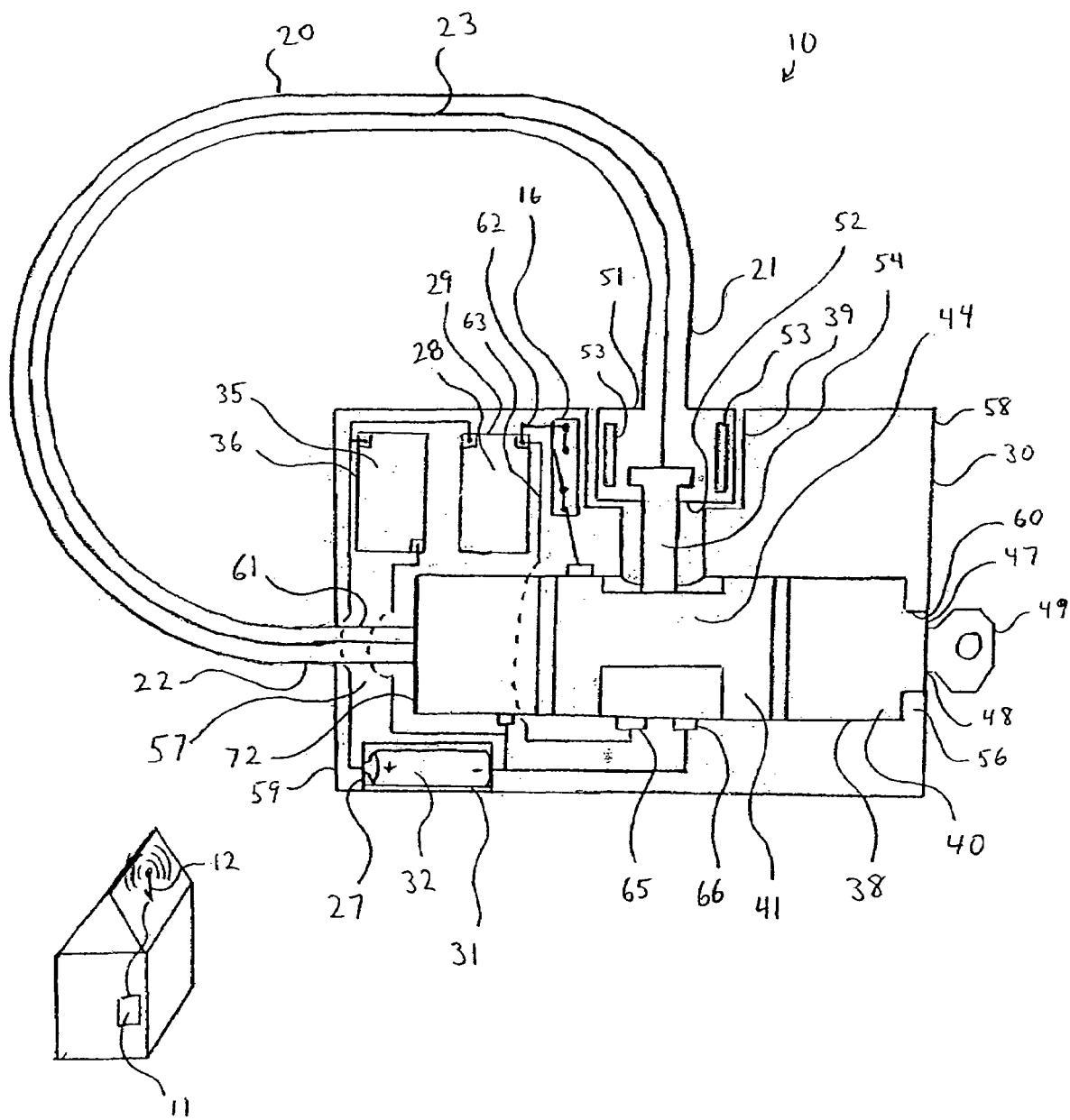
FIG. 2 is a cross sectional view of the portable locking device of FIG. 1 with the cylindrical latching mechanism illustrated not in cross section but in full to illustrate the locked position.

The electrically conductive catch portion 41 of the latching mechanism 40 comprises a socket 43 adapted to receive without touching the plug or bolt 54 of the latch 50. The catch portion 41 further comprises an arm 44 to contact, engage and retain the metal bolt 54 within the socket 43 when the latch 50 is fully inserted within the latch cavity 39 (as shown in FIG. 2). When the latching mechanism 40 is in the locked position shown in FIG. 2, the arm 44 engages the bolt 54 and prevents the removal of the bolt 54 and latch 50 from the latch cavity 39. It also creates an electrically conductive contact between the bolt 54 and the catch portion 41. When the latching mechanism 40 is in the unlocked position shown in FIG. 1, the bolt 54 may be inserted or removed from the socket 43 and, even if the latch 50 remains inserted within the latch cavity 39, the electrical contact between the bolt 54 and the arm 44 of the catch portion 41 is broken.

The flexible cable 20 of the locking device 10 has a proximate end 22 and a distal end 21. The proximate end 22 of the cable 20 connects to the electrically conductive second end 55 of the latching mechanism 40 and the cable 20 exits the housing 30 through cavity opening 61. The distal end 21 of the cable 20 connects to the base 51 of the latch 50. The cable 20 is made from a sturdy, non-rigid material such as an intertwined steel cable with plastic sheeting. An insulated electrically conductive wire 23 within the cable 20 runs the length of cable 20 from the proximate end 22 to the distal end 21. At the proximate end 22, the wire 23 is electrically connected to second end 55 of the latching mechanism 40. At the distal end 21 of the cable 20, the wire 23 is electrically connected to the bolt 54 of the latch 50.

The cable 20 may have a length as desired for the intended purpose of use. For example, for locking smaller items, a cable 20 of shorter length may be desired. On the other hand, the advantages of a flexible cable 20 are more easily taken advantage of when a longer cable 20 is used. The preferred cable 20 length ranges between about 4 inches to about 8 feet, though shorter and longer cables are certainly within contemplation. Similarly, differently sized locking devices 10, for example small, medium, large and extra large, for different purposes may be manufactured according to the claims of the present invention.

The latch 50 comprises of a base 51 and a top 52. The latch 50 contains one or more magnets 53 about its periphery between the top 52 and the base 51.

An electrically conductive bolt 54 extends from the top 52 of the latch 50. The latch 50 is sized to be closely received within the latch cavity 39, and when so positioned, the bolt 54 slides into the socket 43 of the latching mechanism 40 when it is in the unlocked position, and may be locked into place by turning the latching mechanism 40 into the locked position with the key 49. Thus it can be seen that the distal end 21 and latch 50 of the cable 20 may be releasably removed from the housing 30. Once removed, the free distal end 21 of the flexible cable 20 may be threaded around or through the object (not shown) to be locked, and then the latch 50 re-inserted into the latch cavity 39 and locked into place by turning the key 49.

The housing 30 about the latch cavity 39 further comprises a normally open magnetic contact switch 16 positioned adjacent to the latch cavity 39 so that the magnetic contact switch 16 may be activated to the closed position by the magnet 53 of the latch 50 when the latch 50 is inserted within the latch cavity 39.

The latching mechanism cavity 38 further comprises a cable contact point 67, an armed circuit contact point 64, and a pair of first and second disarmed circuit contact points 65, 66. The cable contact point 67 touches the second end 55 of the latching mechanism 40 to create an electrical connection to the electrically conductive second end 55 of the latching mechanism 40, regardless of whether the latching mechanism 40 is in the locked or unlocked position. The armed circuit contact point 64 creates an electrical connection to the electrically conductive catch portion 41 of the latching mechanism 40, regardless of whether the latching mechanism 40 is in the locked or unlocked position. At least one of the first and second disarmed circuit contact points 65, 66 touches the arm 44 and both at least touch the catch portion 41 to create separate electrical connections to the electrically conductive catch portion 41 of the latching mechanism 40 only when the latching mechanism 40 is in the unlocked position.

The transmitter cavity 29 houses a wireless transmitter 28. When powered by the flow of current from the battery 32, the locking device's 10 wireless transmitter 28 can transmit the condition of the locking device 10 either continuously or periodically to the receiver 12 of a security system 11.

As illustrated in FIG. 1, the locking device 10 of the present invention further comprises an armed circuit 62 and a disarmed circuit 63. The armed circuit 62 and disarmed circuit 63 are parallel circuits, each capable of supplying electric current to the wireless transmitter 28 when complete unless the locking device 10 has been compromised. The armed circuit 62 comprises the following components electrically connected in series: one end of the battery 32 electrically connected (by a wire) to a first terminal of the wireless transmitter 28; the second terminal of the wireless transmitter 28 electrically connected to a first terminal of the normally open magnetic contact switch 16; the second terminal of the magnetic contact switch 16 electrically connected to the armed circuit contact point 64, the armed circuit contact point 64 electrically connected to the catch portion 41 of the latching mechanism 40; the catch portion 41 electrically connected to the bolt 54; the bolt 54 electrically connected to the insulated wire 23; the insulated wire 23 electrically connected to the electrically conductive second end 55 of the latching mechanism 40; the second end 55 of the latching mechanism 40 electrically connected to the cable contact point 67, the cable contact point 67 electrically connected to the other end of the battery 32. Thus it can be seen that in order for the armed circuit 62 to carry an electric current, the latch 50 must be inserted into the latch cavity 39 so that the magnet 53 in the latch 50 closes the normally open magnetic switch 16, and the latching mechanism 40 must be in the locked position so that the arm 44 of the catch portion 41 is electrically connected to the bolt 54. Without these two conditions being fulfilled, no current will pass through the wireless transmitter 28 allowing it to function. When current is supplied to the wireless transmitter 28 through the armed circuit 62, if the cable 20 were cut, the armed circuit 62 would be broken. As stated before, the wireless transmitter 27 can transmit the condition of the locking device 10 either continuously or periodically to the receiver (not shown) of a security system 11. If no current is supplied to the wireless transmitter 28, then no communication with the security system 11 will be possible, and the security system 11 will be alerted to the fact that the locking device 10 has failed or been compromised. Similarly, if locking device 10 and the object (not shown) to which it is locked are physically carried away from the security system 11 out of the effective range of the wireless transmitter 27, then the wireless transmitter 27 will have no communication with the security system 11 and, without communication, the security system 11 will be programmed to provide an appropriate response, such as an alert or the sounding of an alarm.

The disarmed circuit 63 comprises the following components electrically connected in series: one end of the battery 32 electrically connected to a first terminal of the wireless transmitter 28; the second terminal of the wireless transmitter 28 electrically connected to the first disarmed circuit contact point 65; the first disarmed circuit contact point 65 electrically connected to the electrically conductive catch portion 41 of the latching mechanism 40 (only when in the unlocked position), the catch portion 41 electrically connected to the second disarmed circuit contact point 66; the second disarmed circuit contact point 66 electrically connected to the other end of the battery 32. Thus it can be seen that the disarmed circuit 63 may only carry current through the wireless transmitter 28 when the latching mechanism 40, and hence the arm 44 of the catch portion 41 are in the unlocked position. And because the latching mechanism 40 may only be turned to the unlocked position when the key 49 is in the slot 48, the key 49 must be present for the wireless transmitter 28 of the portable locking device 10 to be powered when the latch is not in place within the latch cavity 39. The disarmed circuit 63, then, is useful only when one with access to the key 49, presumably an authorized user, unlocks the lock 10. Assuming one with the key 49 is authorized, it is desirable for the wireless transmitter 28 to continue reporting to the security system 11, indicating that all is well with the locking device 10.

As shown in FIG. 1, the alternate GPS cavity 36 houses a GPS tracking unit 35 including a small radio frequency transceiver which allows it and the locking device 10 that it is in to be tracked and its movement monitored. If so equipped, the locking device 10 further comprises a GPS circuit 72 in parallel with the armed circuit 62 and disarmed circuit 63. The GPS circuit 72 comprises the following components electrically connected in series: one end of the battery 32 electrically connected to a first terminal of the GPS tracking unit 35; the second terminal of the GPS tracking unit 35 electrically connected to the other end of the battery 32. Thus it can be seen that as long as the battery 32 lasts, current will be supplied through the GPS tracking unit 35 so that it will be operational. Because the GPS circuit 72 is wired in parallel with the armed circuit 62 and disarmed circuit 63, the GPS tracking unit will continue to receive electrical current and remain operational even if the locking device 10 is compromised.

By means of the wireless transmitter 28, the locking device 10 may be integrated into a home security system 11 or other security monitoring device. If the locking device 10 is taken out of range of the transmitter 28 from the base receiver 12 of the security system 11, the security system 11 recognizes the interruption in the signal of the wireless transmitter 28 of the locking device 10 and the security system 11 which can either sound an alarm, dispatch police or contact the owner, depending on the security system 11.

If the armed circuit 62 is disrupted, such as by cutting the cable 20 or removing the latch 50, the failure of the wireless transmitter 28 to communicate with the security system 11 will alert the security system 11 to either sound an alarm, dispatch police or contact the owner, depending on the security system 11 and the desired settings.

Additionally, if the battery 32 runs low, the wireless transmitter 28 may be programmed to trigger a warning from the security system 11.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, I claim:

1. A portable locking device comprising:
   (a) a housing for retaining a cylindrical latching mechanism, said cylindrical latching mechanism comprising a first end, a first electrically non-conductive spacer, an electrically conductive catch portion, a second electrically non-conductive spacer, and an electrically conductive second end;
   (b) said first end of the cylindrical latching mechanism comprising a lock mechanism capable of interacting with a cooperating portion of the housing to lock the cylindrical latching mechanism in place relative to the housing;
   (c) said cylindrical latching mechanism positionable between a normal locked position when the lock mechanism is locked, and an unlocked position when the lock mechanism is unlocked;
   (d) said housing further defining an opening to the second end of the cylindrical latching mechanism;
   (e) said housing further comprising a latch cavity, said latch cavity opening onto the catch portion of the cylindrical latching mechanism;
   (f) a flexible cable having proximate and distal ends and an insulated electrically conductive wire within the cable, said insulated wire running from the proximate end to the distal end of the flexible cable, said flexible cable connected at the proximate end to the electrically conductive second end of the cylindrical latching mechanism through the opening in the housing, said flexible cable further connected at the distal end to a latch sized to be removably received within said latch cavity;

(g) said latch comprising an electrically conductive bolt extending therefrom, and one or more magnets about its periphery, said electrically conductive bolt electrically connected to the insulated wire at the distal end of the flexible cable;

(h) said bolt being electrically connected to and retained by contact with the catch portion of the cylindrical latching mechanism when the latch is inserted within the latch cavity and the cylindrical latching mechanism is in the normal locked position, and said bolt not being electrically connected to or retained by the catch portion of the cylindrical latching mechanism when the latch is inserted within the latch cavity and the cylindrical latching mechanism is in the unlocked position;

(i) a wireless transmitter housed within said housing;

(j) a power source housed within said housing;

(k) a normally open magnetic contact switch housed within the housing adjacent to the latch cavity;

(l) an armed circuit and a disarmed circuit, said armed and disarmed circuits being parallel electrical circuits;

(m) said armed circuit being completed only when the latch is inserted within the latch cavity and the cylindrical latching mechanism is in the locked position said armed circuit comprising, in series, the power source, the wireless transmitter, the normally open magnetic contact switch, the catch portion of the cylindrical latching mechanism, the bolt of the latch, the insulated wire of the flexible cable, and the second end of the latching mechanism;

(n) said disarmed circuit being completed only when the cylindrical latching mechanism is in the unlocked position, said disarmed circuit comprising, in series, the power source, the wireless transmitter, and the catch portion of the cylindrical latching mechanism.

2. The portable locking device of claim 1 wherein the wireless transmitter transmits the condition of the portable locking device to a receiver of a security system.

3. The portable locking device of claim 1 wherein the housing further comprises a cylindrical latching mechanism cavity about the latching mechanism, said latching mechanism cavity further comprising a cable contact point, an armed circuit contact point, and first and second disarmed circuit contact points, said electrically conductive catch portion of the cylindrical latching mechanism being in contact with only the armed circuit contact point when the cylindrical latching mechanism is in the locked position, and said electrically conductive catch portion of the cylindrical latching mechanism being in contact with only the first and second disarmed circuit contact points when the cylindrical latching mechanism is in the locked position.

4. The portable locking device of claim 3 wherein the armed circuit further comprises the armed circuit contact point and the cable contact point electrically connected in series.

5. The portable locking device of claim 3 wherein the disarmed circuit further comprises the first and second disarmed circuit contact points electrically connected in series.

6. The portable locking device of claim 1 further comprising a GPS tracking unit housed within the housing, said GPS tracking unit electrically connected to the power source.

7. The portable locking device of claim 1 wherein the housing further comprises a power source cavity for housing the power source, said power source cavity further comprising a removable cavity cover.

8. The portable locking device of claim 7 wherein the removable cavity cover comprises a portion of a wall of the latch cavity.

9. The portable locking device of claim 7 wherein the cavity cover further comprises a solar cell for recharging the power source.

10. The portable locking device of claim 1 wherein the flexible cable has a length between about 4 inches to about 8 feet.

11. The portable locking device of claim 1 wherein the flexible cable comprises an intertwined steel cable with plastic sheeting.

12. A portable locking device comprising:

(a) a hardened housing enclosing a cylindrical latching mechanism cavity, said cylindrical latching mechanism cavity transversing the housing and having openings through the housing at both ends, said openings defined by narrowing abutments at either end of the cylindrical latching mechanism cavity;

(b) said housing further comprising a latch cavity opening into the cylindrical latching mechanism cavity within the housing;

(c) a wireless transmitter housed within an internal transmitter cavity inside said housing;

(d) a power source housed within an internal power source cavity inside said housing, said power source having first and second terminals;

(e) a normally open magnetic contact switch positioned within the housing adjacent to the latch cavity, said normally open magnetic contact switch having first and second terminals;

(f) a cylindrical latching mechanism enclosed within the cylindrical latching mechanism cavity, said cylindrical latching mechanism comprising a first end, said first end adjoined to a first electrically non-conductive spacer, said first electrically non-conductive spacer further adjoining an electrically conductive catch portion, said electrically conductive catch portion further adjoining a second electrically non-conductive spacer, said second electrically non-conductive spacer further adjoining an electrically conductive second end;

(g) said first end of the cylindrical latching mechanism having an internal lock mechanism capable of interacting with a cooperating portion of the housing to lock the cylindrical latching mechanism in place relative to the housing;

(h) said lock mechanism operable between a locked and unlocked condition;

(i) said cylindrical latching mechanism positionable between a normal locked position when the lock mechanism is locked, and an unlocked position when the lock mechanism is unlocked;

(j) said latching mechanism cavity further comprising a cable contact point, an armed circuit contact point, and first and second disarmed circuit contact points, said electrically conductive catch portion of the cylindrical latching mechanism being in contact with only the armed circuit contact point when the cylindrical latching mechanism is in the locked position, and said electrically conductive catch portion of the cylindrical latching mechanism being in contact with only the first and second disarmed circuit contact points when the cylindrical latching mechanism is in the locked position;

(k) a flexible cable having proximate and distal ends and an insulated electrically conductive wire within the cable, said insulated wire running from the proximate end to the distal end of the flexible cable, said flexible cable connected at the proximate end to the electrically conductive second end of the cylindrical latching mechanism through one of the openings in the housing, said flexible cable further connected at the distal end to a latch sized to be removably received within said latch cavity, said latch comprising a base, a top, an electrically conductive bolt extending from the top, and one or more magnets about its periphery between the top and the base, said electrically conductive bolt electrically connected to the insulated wire at the distal end of the flexible cable;

(l) said bolt being electrically connected to and retained by contact with the catch portion of the cylindrical latching mechanism when the latch is inserted within the latch cavity and the cylindrical latching mechanism is in the normal locked position, and said bolt not being electrically connected to or retained by the catch portion of the cylindrical latching mechanism when the latch is inserted within the latch cavity and the cylindrical latching mechanism is in the unlocked position;

(m) parallel armed and disarmed circuits;

(n) said armed circuit comprising a first terminal of the power source, the wireless transmitter, a first terminal of the normally open magnetic contact switch, a second terminal of the normally open magnetic contact switch, the armed circuit contact point, the catch portion of the cylindrical latching mechanism, the bolt of the latch, the insulated wire of the flexible cable, the second end of the latching mechanism, and the second terminal of the power source electrically connected in series;

(o) said armed circuit being completed only when the latch is inserted within the latch cavity and the cylindrical latching mechanism is in the locked position;

(p) said disarmed circuit comprising a first terminal of the power source, the wireless transmitter, the first disarmed circuit contact point, the catch portion of the cylindrical latching mechanism, the second disarmed circuit contact point, and the second terminal of the power source electrically connected in series;

(q) said disarmed circuit being completed only when the cylindrical latching mechanism is in the unlocked position.

13. The portable locking device of claim 12 wherein the wireless transmitter transmits the condition of the portable locking device to a receiver of a security system.

14. The portable locking device of claim 12 wherein the latching mechanism cavity further comprises a cable contact point and wherein the armed circuit further comprises said cable contact point electrically connected in series.

15. The portable locking device of claim 12 further comprising a GPS tracking unit housed within a GPS cavity within the housing, said GPS tracking unit electrically connected to the power source.

16. The portable locking device of claim 12 wherein the power source cavity further comprises a removable cavity cover.

17. The portable locking device of claim 16 wherein the removable cavity cover comprises a portion of a wall of the latch cavity.

18. The portable locking device of claim 16 wherein the cavity cover further comprises a solar cell for recharging the power source.

19. The portable locking device of claim 12 wherein the flexible cable has a length between about 4 inches to about 8 feet.

20. The portable locking device of claim 12 wherein the flexible cable comprises an intertwined steel cable with plastic sheeting.

* * * * *